(12) United States Patent
Gutleben et al.

(10) Patent No.: US 11,815,732 B2
(45) Date of Patent: Nov. 14, 2023

(54) LIQUID LENS DESIGN VARIANT WITH TEMPERATURE SENSOR ON THE OUTSIDE

(71) Applicants: CORNING INCORPORATED, Corning, NY (US); LG INNOTEK CO., LTD., Seoul (KR)

(72) Inventors: Christian Daniel Gutleben, Ventura, CA (US); Shiwen Liu, Painted Post, NY (US); Nicholas James Pfister, Santa Barbara, CA (US); Ernesto Sanchez, Jr., Ventura, CA (US)

(73) Assignees: CORNING INCORPORATED, Corning, NY (US); LG INNOTEK CO. LTD., Seoul (KR)

(*) Notice: Subject to any disclaimer, the term of this patent is extended or adjusted under 35 U.S.C. 154(b) by 413 days.

(21) Appl. No.: 16/943,732

(22) Filed: Jul. 30, 2020

(65) Prior Publication Data
US 2021/0048602 A1 Feb. 18, 2021

Related U.S. Application Data

(60) Provisional application No. 62/888,152, filed on Aug. 16, 2019.

(51) Int. Cl.
*G02B 7/02* (2021.01)
*G02B 1/11* (2015.01)
*G02B 3/14* (2006.01)

(52) U.S. Cl.
CPC ............... *G02B 7/028* (2013.01); *G02B 1/11* (2013.01); *G02B 3/14* (2013.01)

(58) Field of Classification Search
CPC . G02B 7/028; G02B 1/11; G02B 3/14; G02B 27/646; G02B 26/005; G03F 7/0005; C23F 1/02; C23F 4/00; G01K 15/00; G01K 15/005; G01K 15/007; G01K 7/00; G01K 7/01; G01K 7/015; G01K 7/18; G01K 7/183; G01K 7/186
See application file for complete search history.

(56) References Cited

U.S. PATENT DOCUMENTS

| | | | |
|---|---|---|---|
| 7,388,705 B2 | 6/2008 | Onuki et al. | |
| 8,517,270 B2 | 8/2013 | Komi | |
| 9,201,174 B2* | 12/2015 | Karam | G02B 3/12 |
| 2003/0098445 A1* | 5/2003 | Higuma | G01J 5/20 |
| | | | 252/500 |
| 2015/0338557 A1 | 11/2015 | Nunnink et al. | |
| 2018/0136372 A1* | 5/2018 | Patscheider | G02B 26/004 |

FOREIGN PATENT DOCUMENTS

| KR | 20180087082 A * | 8/2018 |
|---|---|---|
| WO | 2018/187578 A2 | 10/2018 |

* cited by examiner

*Primary Examiner* — James C. Jones
(74) *Attorney, Agent, or Firm* — Tamika A. Crawl-Bey

(57) ABSTRACT

A liquid lens apparatus includes a first substrate and a sensor. The first substrate has first and second opposing surfaces, a central portion, and a peripheral portion outside of the central portion. The sensor is formed lithographically on either the first or second surfaces of the peripheral portion of the first substrate such that the sensor is on an exterior surface of the liquid lens apparatus. The sensor is configured to detect a temperature of the liquid lens apparatus to enable compensation for thermal expansion or contraction of the liquid lens apparatus resulting from changes in temperature of the liquid lens apparatus.

10 Claims, 11 Drawing Sheets

LIQUID LENS DESIGN VARIANT WITH TEMPERATURE SENSOR ON THE OUTSIDE

CROSS-REFERENCE TO RELATED APPLICATIONS

This application claims the benefit of priority under 35 U.S.C. § 119 of U.S. Provisional Application No. 62/888,152, filed Aug. 16, 2019, the content of which is incorporated herein by reference in its entirety.

BACKGROUND

Field

The present disclosure relates to liquid lens apparatuses and systems, for example, transmissive expandable liquid lens apparatuses and systems.

Technical Background

Liquid lenses generally have a cavity containing two immiscible liquids. Varying an electric field to which the liquids are subjected can vary the wettability of one of the liquids with respect to the cavity wall, thereby varying the shape of the meniscus formed between the two liquids. As liquid lenses are subjected to varying temperatures, the liquids can expand and force windows of the liquid lens to deflect. In an attempt to gain control over this dynamic variation, liquid lenses contain heaters to elevate the operating temperatures and thermal sensors to attempt to provide feedback via a controller to stabilize the temperature. However, due to the limited space within liquid lenses, it has been difficult to incorporate temperature sensors in liquid lenses that have sufficient properties to promptly and accurately provide feedback to controllers. Moreover, since temperature sensors are typically in close proximity to the liquids, the resulting lens can suffer from electrical leakage and low reliability.

SUMMARY

In some embodiments, a liquid lens apparatus includes a first substrate and a heat sensor. The first substrate has first and second opposing surfaces, a central portion, and a peripheral portion outside of the central portion. The heat sensor is formed lithographically on either the first or second surface of the peripheral portion of the first substrate such that the heat sensor is on an exterior surface of the liquid lens apparatus. The heat sensor is configured to detect a temperature of the liquid lens apparatus to enable compensation for thermal expansion of the liquid lens apparatus resulting from changes in the temperature of the liquid lens apparatus.

In some embodiments, the first substrate also has a window. In some embodiments, the window is configured to flex outward upon an increase of the temperature of the liquid lens apparatus. In some embodiments, the liquid lens apparatus also includes a second substrate and a cavity defined by at least the first substrate and the second substrate such the first surface of the first substrate is outside of the cavity.

In some embodiments, the liquid lens apparatus further includes a heating device configured to provide the application of heat to the liquid lens apparatus that is sufficient to increase the temperature of the liquid lens apparatus and to thermally expand the liquid lens apparatus. In some embodiments, the heat sensor is isolated from the heating device. In some embodiments, the heat sensor is configured to detect a change in the temperature of 0.1-degree centigrade. In some embodiments, the heat sensor has a target resistance of 1500 ohms. In some embodiments, the heat sensor is at least 120 µm from an interior of the liquid lens apparatus. In some embodiments, the heat sensor is made of a material having a temperature coefficient of resistance (TCR) that is less than 6.0. In some embodiments, the heat sensor is made of a material having a temperature TCR that is greater than 1.0 and less than 6.0.

In some embodiments, a method for forming a substrate having a sensor includes depositing a resistive element onto a first surface of a substrate used to construct a liquid lens apparatus. In some embodiments, the substrate has first and second opposing surfaces, a central portion, and a peripheral portion outside of the central portion. In some embodiments, the method also includes forming a lithographic mask having a preconfigured design on the peripheral portion of either the first or second surfaces of the peripheral portion of the first substrate and removing a portion of the resistive element that is outside of the lithographic mask from the substrate such that a heat sensor having the preconfigured design of the lithographic mask is formed from a remaining portion of resistive element beneath the mask. In some embodiments, the method further includes removing the lithographic mask from the heat sensor such that the heat sensor is to be placed on an external surface of the liquid lens apparatus. In some embodiments, the heat sensor is configured to detect a temperature of the liquid lens apparatus from an application of heat applied to the liquid lens apparatus and to enable control of the thermal expansion of the liquid lens apparatus resulting from the application of heat applied to the liquid lens apparatus.

In some embodiments, the method further includes depositing a dielectric layer onto the first surface of the substrate and onto the remaining portion of the resistive element, depositing a second mask onto the dielectric layer, and forming a window in the central portion of the substrate and through the dielectric layer, the second mask, and a portion of the substrate.

In some embodiments, the method also includes removing the second mask from the dielectric layer, depositing an anti-reflective coating onto the dielectric layer overlying the peripheral portion of the substrate and into the window of the substrate, and depositing a third mask onto the anti-reflective coating. In some embodiments, the method additionally includes removing the anti-reflective coating and a portion of the dielectric layer residing beneath the second portion of the anti-reflective coating and removing the second mask from the anti-reflective coating.

In some embodiments, an imaging system includes a liquid lens apparatus. The liquid lens apparatus has a first substrate and a heat sensor. The first substrate includes first and second opposing surfaces, a central portion, and a peripheral portion outside of the central portion. The heat sensor is formed lithographically on either the first or second surfaces of the peripheral portion of the first substrate such that the heat sensor is on an exterior surface of the liquid lens apparatus. The heat sensor is configured to detect a temperature of the liquid lens apparatus from an application of heat applied to the liquid lens apparatus and to enable control of thermal expansion of the liquid lens apparatus resulting from the application of heat applied to the liquid lens apparatus.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
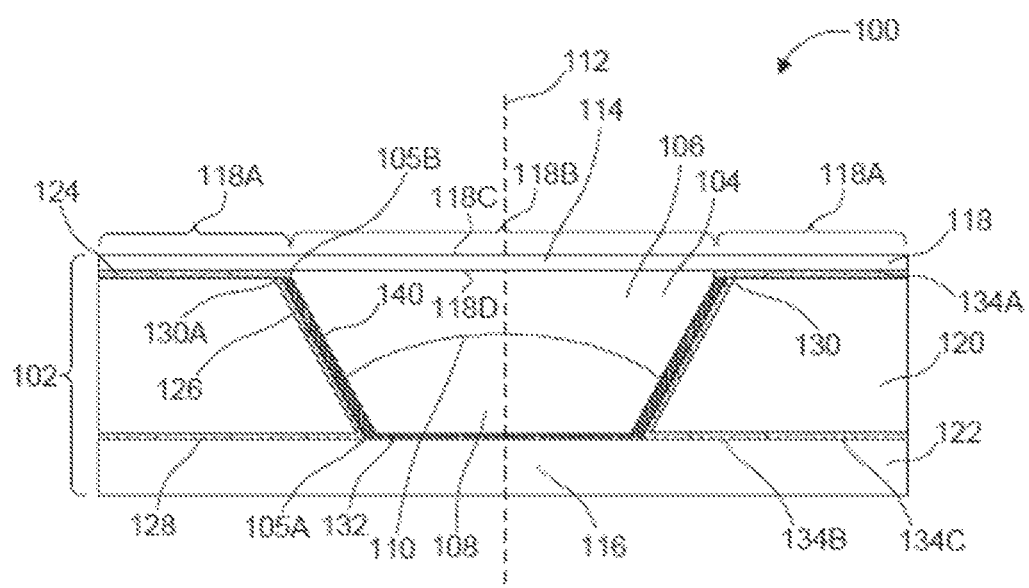
FIG. 1 is a schematic cross-sectional view of a liquid lens apparatus, according to some embodiments.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more embodiments that incorporate the features of this disclosure. The disclosed embodiments are merely exemplary. The scope of the disclosure is not limited to the specifically disclosed embodiment(s). The invention is defined by the claims appended hereto.

The embodiment(s) described, and references in the specification to "one embodiment," "an embodiment," "an example embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Spatially relative terms, such as "beneath," "below," "lower," "above," "on," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (e.g., rotated 90 degrees or at other orientations) and the spatially relative descriptors used herein may likewise be interpreted accordingly.

The term "about" or "substantially" as used herein indicates the value of a given quantity that can vary based on a particular technology. Based on the particular technology, the term "about" or "substantially" can indicate a value of a given quantity that varies within, for example, 1-15% of the value (e.g., ±1%, ±2%, ±5%, ±10%, or ±15% of the value).

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint and independently of another endpoint.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions, in fact, result from computing devices, processors, controllers, or other devices executing the firmware, software, routines, instructions, etc.

Exemplary Liquid Lens Apparatus

As discussed above, liquid lenses generally include two immiscible liquids disposed within a cavity disposed between a first window and a second window. Varying an electric field to which the liquids are subjected can vary the wettability of one of the liquids with respect to the cavity wall, thereby varying the shape of the meniscus formed between the two liquids and, thus, changing the optical focal length of the liquid lens.

FIG. 1 illustrates a schematic cross-sectional view of liquid lens apparatus 100, according to some embodiments. In some embodiments, liquid lens apparatus 100 can include a lens body 102 and a cavity 104 formed in the lens body 102. A first liquid 106 and a second liquid 108 can be disposed within cavity 104. In some embodiments, first liquid 106 can be a polar liquid or a conducting liquid. Additionally, or alternatively, second liquid 108 can be a nonpolar liquid or an insulating liquid. In some embodiments, first liquid 106 and second liquid 108 have different refractive indices such that an interface 110 between first liquid 106 and second liquid 108 forms a lens. In some embodiments, first liquid 106 and second liquid 108 have substantially the same density, which can help to avoid changes in the shape of interface 110 as a result of changing the physical orientation of liquid lens apparatus 100 (e.g., as a result of gravitational forces).

In some embodiments, first liquid 106 and second liquid 108 can be in direct contact with each other at interface 110. For example, first liquid 106 and second liquid 108 can be substantially immiscible with each other such that the contact surface between first liquid 106 and second liquid 108 defines interface 110. In some embodiments, first liquid 106 and second liquid 108 can be separated from each other at interface 110. For example, first liquid 106 and second liquid 108 can be separated from each other by a membrane (e.g., a polymeric membrane) that defines interface 110.

In some embodiments, cavity 104 can be defined by a bore in a second substrate 120 of liquid lens apparatus 100, as described herein. In some embodiments, at least a portion of first liquid 106 can be disposed in cavity 104. Additionally, or alternatively, second liquid 108 can be disposed within cavity 104. For example, substantially all or a portion of second liquid 108 can be disposed within cavity 104. In some embodiments, the perimeter of interface 110 (e.g., the edge of the interface in contact with the sidewall 140 of the cavity 104) can be disposed within cavity 104.

In some embodiments, interface 110 can be adjusted via electrowetting. Electrowetting is a modification of the wetting properties or wettability (e.g., the ability of a liquid to maintain contact with a surface) of a surface with an applied electric field. For example, a voltage can be applied between first liquid 106 and a surface of cavity 104 (e.g., an electrode positioned near the surface of the cavity 104 and insulated from first liquid 106, as described herein) to increase or decrease the wettability of the surface of the cavity 104 with respect to the first liquid 106 and change the shape of interface 110.

In some embodiments, adjusting interface 110 changes the shape of the interface, which changes the focal length or focus of liquid lens apparatus 100. For example, such a change of focal length can enable liquid lens apparatus 100 to perform an autofocus function. Additionally, or alternatively, adjusting interface 110 tilts the interface relative to a structural axis 112 of liquid lens apparatus 100 (e.g., to tilt an optical axis of liquid lens apparatus 100 relative to the structural axis of liquid lens apparatus 100). For example, such tilting can enable liquid lens apparatus 100 to perform an optical image stabilization (OIS) function. Adjusting interface 110 can be achieved without physical movement of liquid lens apparatus 100 relative to an image sensor, a fixed lens or lens stack, a housing, or other components of a camera module in which liquid lens apparatus 100 can be incorporated.

In some embodiments, lens body 102 of liquid lens apparatus 100 can include a first window 114 and a second window 116. In some of such embodiments, cavity 104 can be disposed between first window 114 and second window 116. In some embodiments, lens body 102 can include a plurality of layers that cooperatively form the lens body 102. For example, in the embodiments shown in FIG. 1, lens body 102 can include a first substrate 118 (e.g., a first outer layer), second substrate 120 (e.g., an intermediate layer), and a third substrate 122 (e.g., a second outer layer).

In some embodiments, first substrate 118 can be or can comprise a flexible membrane. First substrate 118 can include a central portion 118B and a peripheral portion 118A. In some embodiments, central portion 118B can coincide with first window 114. First substrate 118 can include an exterior side 118C (e.g., upper surface of lens body 102) and an interior side 118D (e.g., facing first liquid 106).

In some embodiments, second substrate 120 can include a bore formed therethrough. For example, second substrate 120 can include cavity 104.

In some embodiments, first substrate 118 can be bonded to one side (e.g., the object side) of second substrate 120. For example, first substrate 118 (e.g., peripheral portion 118A) can be bonded to second substrate 120 at a bond 134A. Bond 134A can be an adhesive bond, a laser bond (e.g., a laser weld), or another suitable bond capable of maintaining first liquid 106 and second liquid 108 within cavity 104 (e.g., sealing first liquid 106 and second liquid 108 within cavity 104, or hermetically sealing cavity 104). Additionally, or alternatively, third substrate 122 can be bonded to the other side (e.g., the image side) of second substrate 120 (e.g., opposite first substrate 118). For example, third substrate 122 can be bonded to second substrate 120 at a bond 134B and/or a bond 134C, each of which can be configured as described herein with respect to bond 134A.

In some embodiments, second substrate 120 can be disposed between first substrate 118 and third substrate 122, the bore in the second substrate 120 is covered on opposing sides by the first substrate 118 and the third substrate 122, and at least a portion of cavity 104 is defined within the bore. Thus, a portion of first substrate 118 covering cavity 104 serves as first window 114, and a portion of third substrate 122 covering cavity 104 serves as second window 116.

In some embodiments, cavity 104 can be defined by the bore in second substrate 120. In some embodiments, cavity 104 can be tapered, as shown in FIG. 1 such that a cross-sectional area of at least a portion of the cavity decreases along structural axis 112 in a direction from the object side (e.g., first substrate 118) toward the image side (e.g., third substrate 122). For example, cavity 104 can include a narrow end 105A and a wide end 105B. The terms "narrow" and "wide" are relative terms, meaning the narrow end is narrower or has a smaller width or diameter than the wide end. Such a tapered cavity 104, or a portion thereof, can have a substantially truncated conical cross-sectional shape. Additionally, or alternatively, such a tapered cavity 104 can help to maintain alignment of interface 110 between first liquid 106 and second liquid 108 along structural axis 112. In some embodiments, cavity 104 can be tapered such that the cross-sectional area of cavity 104 increases along structural axis 112 in the direction from the object side (e.g., first substrate 118) to the image side (e.g., third substrate 122) or non-tapered such that the cross-sectional area of cavity 104 remains substantially constant along structural axis 112. In some embodiments, cavity 104 can be rotationally symmetrical (e.g., about structural axis 112 of liquid lens apparatus 100).

In some embodiments, image light can enter liquid lens apparatus 100 through first window 114, can be refracted at interface 110 between first liquid 106 and second liquid 108, and can exit liquid lens apparatus 100 through second window 116.

In some embodiments, first substrate 118 and/or third substrate 122 can include a sufficient transparency to enable passage of the image light. For example, first substrate 118 and/or third substrate 122 can include a polymeric, glass, ceramic, glass-ceramic material, or the like. In some embodiments, outer surfaces of first substrate 118 and/or third substrate 122 can be substantially planar. Thus, even though liquid lens apparatus 100 can function as a lens (e.g., by refracting image light passing through interface 110), outer surfaces of liquid lens apparatus 100 can be flat as opposed to being curved like the outer surfaces of a fixed lens. Such planar outer surfaces can make integrating liquid lens apparatus 100 into an optical assembly (e.g., a lens stack) less difficult. In some embodiments, outer surfaces of the first substrate 118 and/or the third substrate 122 are curved (e.g., concave or convex). Thus, liquid lens apparatus 100 can include an integrated fixed lens. In some embodiments, second substrate 120 can include a metallic, polymeric, glass, ceramic, glass-ceramic material, or the like. Because image light can pass through the bore (e.g., cavity 104) in second substrate 120, second substrate 120 may or may not be transparent.

Although lens body 102 of liquid lens apparatus 100 is described as including first substrate 118, second substrate 120, and third substrate 122, other embodiments are included in this disclosure. For example, in some embodiments, one or more of the layers can be omitted. For example, the bore in second substrate 120 can be configured as a blind hole that does not extend entirely through second substrate 120, and third substrate 122 can be omitted. In some embodiments, cavity 104 can be disposed within the bore in second substrate 120. Thus, a first portion of cavity 104 can be an upper portion of the bore, and a second portion of cavity 104 can be a lower portion of the bore. In some other embodiments, cavity 104 can be disposed partially within the bore in second substrate 120 and partially outside the bore.

In some embodiments, liquid lens apparatus 100 can include a common electrode 124 in electrical communication with first liquid 106. Additionally, or alternatively, liquid lens apparatus 100 can include a driving electrode 126 disposed on a sidewall 140 of cavity 104 and insulated from first liquid 106 and second liquid 108. In some embodiments, different voltages can be supplied to common electrode 124 and driving electrode 126 (e.g., different voltage differentials can be applied between common electrode 124 and driving electrode 126) to change the shape of interface 110 as described herein.

In some embodiments, liquid lens apparatus 100 can include a conductive layer 128, at least a portion of which is disposed within cavity 104 and/or defines at least a portion of the sidewall 140 of the cavity 104. For example, conductive layer 128 can include a conductive coating applied to second substrate 120 prior to bonding first substrate 118 and/or third substrate 122 to second substrate 120. Conductive layer 128 can include a metallic material, a conductive polymer material, another suitable conductive material, or a combination thereof. Additionally, or alternatively, conductive layer 128 can include a single layer or a plurality of layers, some or all of which can be conductive.

In some embodiments, conductive layer 128 can define common electrode 124 and/or driving electrode 126. For example, conductive layer 128 can be applied to substantially the entire outer surface of second substrate 120 prior to bonding first substrate 118 and/or third substrate 122 to second substrate 120. Following application of conductive layer 128 to second substrate 120, conductive layer 128 can be segmented into various conductive elements (e.g., common electrode 124, driving electrode 126, and/or other electrical devices). In some embodiments, liquid lens apparatus 100 can include one or more scribes 130 in conductive layer 128 to isolate (e.g., electrically isolate) common electrode 124 and driving electrode 126 from each other. For example, scribe 130A can be formed by a photolithographic process, a laser process (e.g., laser ablation), or another suitable scribing process. In some embodiments, scribes 130 can include a gap in conductive layer 128. For example, scribe 130A can be a gap with a width of about 5 µm, about 10 µm, about 15 µm, about 20 µm, about 25 µm, about 30 µm, about 35 µm, about 40 µm, about 45 µm, about 50 µm, or any ranges defined by the listed values.

Although conductive layer 128 is described in reference to FIG. 1 as being segmented following application to second substrate 120, other embodiments are included in this disclosure. For example, in some embodiments, conductive layer 128 can be patterned during application to intermediate layer 120. For example, a mask can be applied to second substrate 120 prior to applying conductive layer 128 such that, upon application of conductive layer 128, masked regions of second substrate 120 covered by the mask can correspond to the gaps in conductive layer 128, and upon removal of the mask, the gaps are formed in conductive layer 128.

In some embodiments, liquid lens apparatus 100 can include an insulating layer 132 disposed within cavity 104. For example, insulating layer 132 can include an insulating coating applied to second substrate 120 prior to bonding first substrate 118 and/or third substrate 122 to second substrate 120. In some embodiments, insulating layer 132 can include an insulating coating applied to conductive layer 128 and second window 116 after bonding third substrate 122 to second substrate 120 and prior to bonding first substrate 118 to second substrate 120. Thus, insulating layer 132 can cover at least a portion of conductive layer 128 within cavity 104 (e.g., driving electrode 126) and second window 116. In some embodiments, insulating layer 132 can be sufficiently transparent to enable passage of image light through second window 116 as described herein. Insulating layer 132 can include polytetrafluoroethylene (PTFE), parylene, another suitable polymeric or non-polymeric insulating material, or a combination thereof. Additionally, or alternatively, insulating layer 132 can include a hydrophobic material. Additionally, or alternatively, insulating layer 132 can include a single layer or a plurality of layers, some or all of which can be insulating.

In some embodiments, insulating layer 132 can cover at least a portion of driving electrode 126 (e.g., the portion of the driving electrode disposed within cavity 104) to insulate first liquid 106 and second liquid 108 from driving electrode 126. Additionally, or alternatively, at least a portion of common electrode 124 can be disposed within cavity 104 and uncovered by insulating layer 132. Thus, common electrode 124 can be in electrical communication with first liquid 106 as described herein. In some embodiments, insulating layer 132 can include a hydrophobic surface layer in cavity 104. Such a hydrophobic surface layer can help to maintain second liquid 108 within a lower portion of cavity 104 (e.g., by attraction between the non-polar second liquid 108 and the hydrophobic material) and/or enable the perimeter of interface 110 to move along the hydrophobic surface layer (e.g., by electrowetting) to change the shape of the interface 110 as described herein.

Example Imaging System

Figure 2:
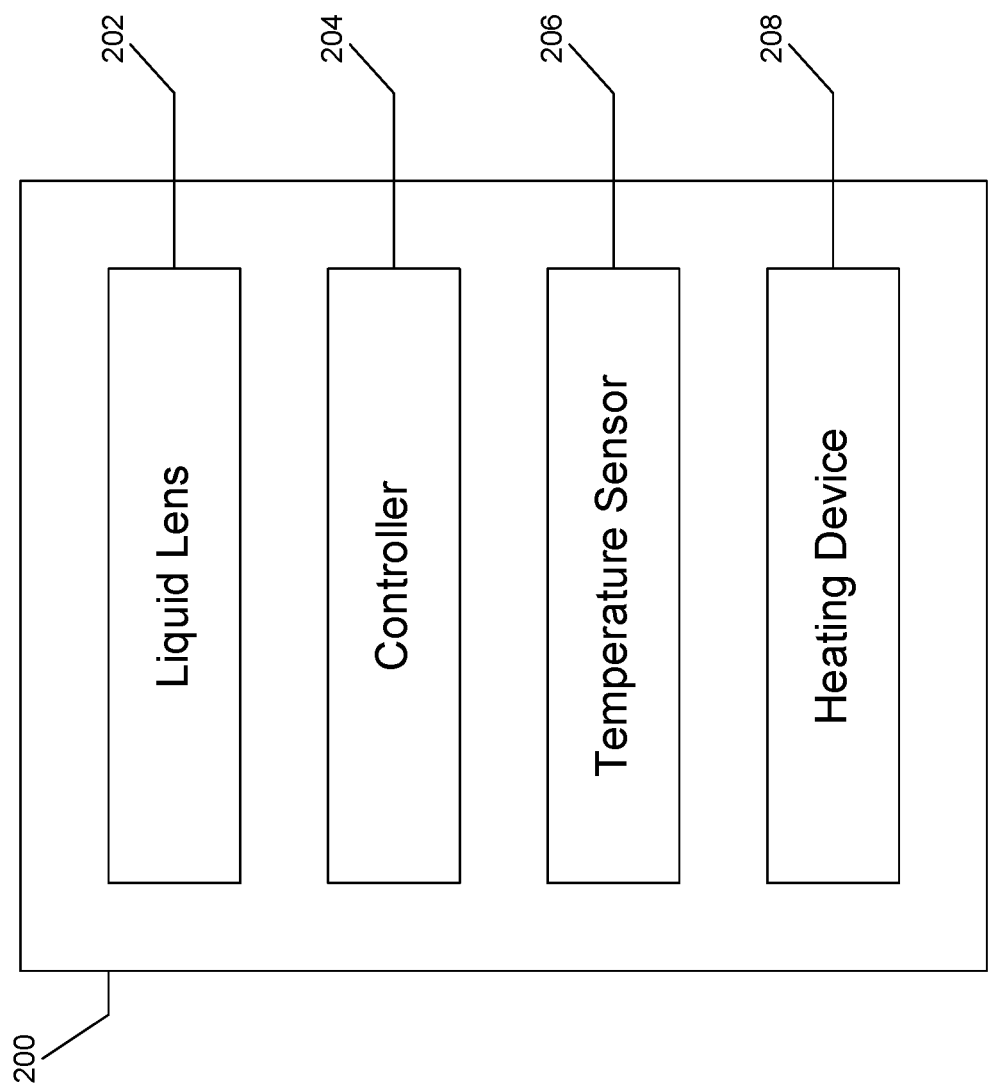
FIG. 2 is a block diagram of an imaging system, according to some embodiments.

FIG. 2 is a block diagram illustrating an example imaging system 200, according to some embodiments. In some embodiments, imaging system 200 comprises a variable focus lens, such as for example, liquid lens 202.

In some embodiments, imaging system 200 comprises a controller 204. Controller 204 can be configured to supply a common voltage to a common electrode of liquid lens 202 and a driving voltage to the driving electrode of the liquid lens. In some embodiments, a shape of interface 110 (FIG. 1) of liquid lens 202 and/or a position of the interface 110 of the liquid lens 202 can be controlled by the voltage differential between the common voltage and the driving voltage. In some embodiments, the common voltage and/or the driving voltage comprises an oscillating voltage signal (e.g., a square wave, a sine wave, a triangle wave, a sawtooth wave, or another oscillating voltage signal). In some embodiments, the voltage differential between the common voltage and the driving voltage comprises a root mean square (RMS) voltage differential. Additionally, or alternatively, the voltage differential between the common voltage and the driving voltage is manipulated using pulse width modulation (e.g., by manipulating a duty cycle of the differential voltage signal), pulse amplitude modulation (e.g., by manipulating the amplitude of the differential voltage signal), another suitable control method, or a combination thereof.

In some embodiments, controller 204 can comprise one or more of a general processor, a digital signal processor, an application-specific integrated circuit, a field-programmable gate array, an analog circuit, a digital circuit, a server processor, combinations thereof, or other now known or later developed processor. Controller 204 can implement one or more of various processing strategies, such as multiprocessing, multitasking, parallel processing, remote processing, centralized processing, or the like. Controller 204 can be responsive to or operable to execute instructions stored as part of software, hardware, integrated circuits, firmware, microcode, or the like.

In some embodiments, imaging system 200 includes a temperature sensor 206, which can be integrated into any components of the imaging system 200 (e.g., the liquid lens 202 and the imaging device 200). Temperature sensor 206 can be configured to detect temperature within liquid lens 202 and generate a temperature signal indicative of the detected temperature. In some embodiments, the voltage differential between the common voltage and the driving voltage is based at least in part on a temperature signal generated by the temperature sensor 206. For example, a detected temperature can be used to compensate for changes in electrical properties and/or physical properties of the liquid lens 202 to obtain a desired characteristic of the liquid lens 202.

In some embodiments, imaging system 200 comprises a heating device 208. In some embodiments, heating device 208 can be integrated into any of the components of imaging system 200. In some embodiments, heating device 208 can produce heat that is used to increase the temperature of the imaging device 200, or a portion thereof, to enable improved speed and/or image quality of the liquid lens 202.

Example Liquid Lens Apparatuses with a Sensor

Figure 3:
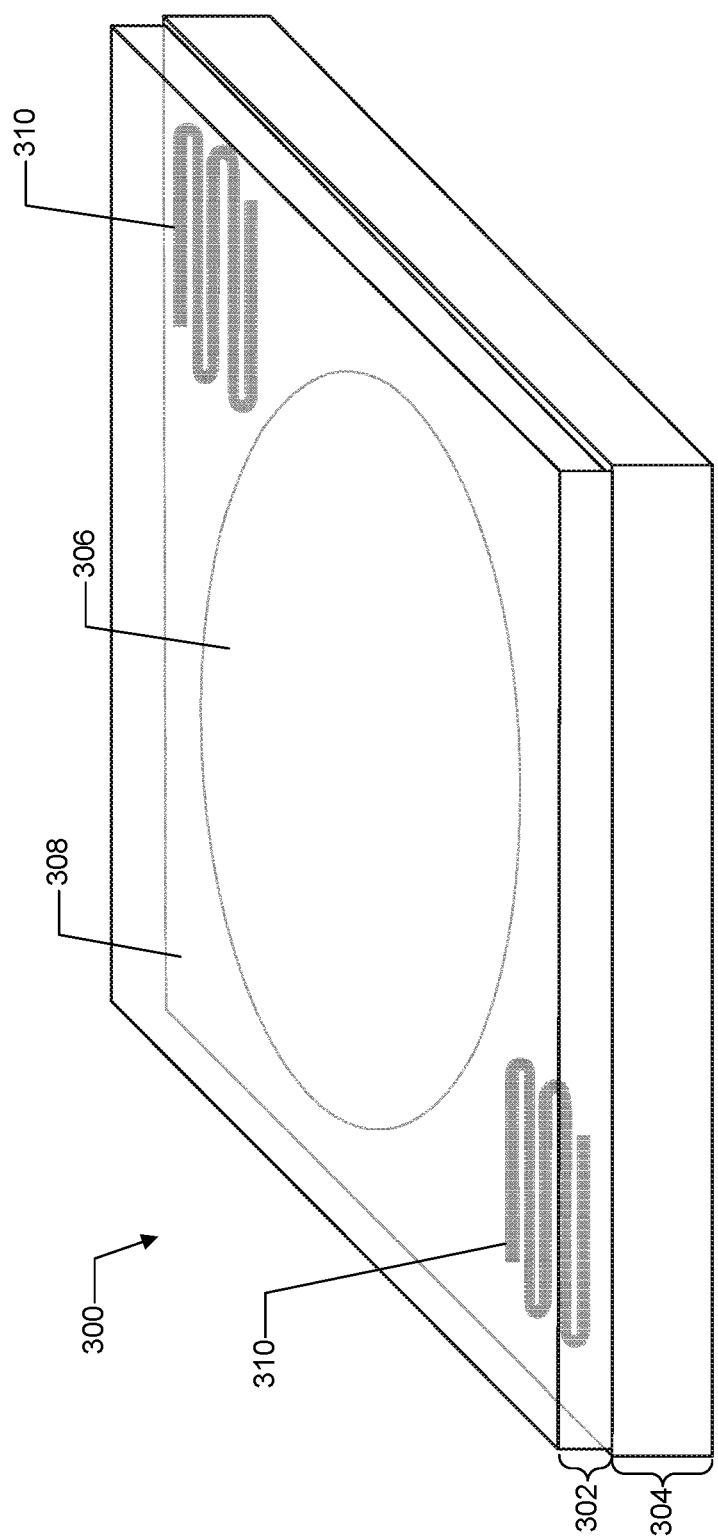
FIGS. 3-5 are top perspective views of a liquid lens apparatus, according to some embodiments.
Figure 4:
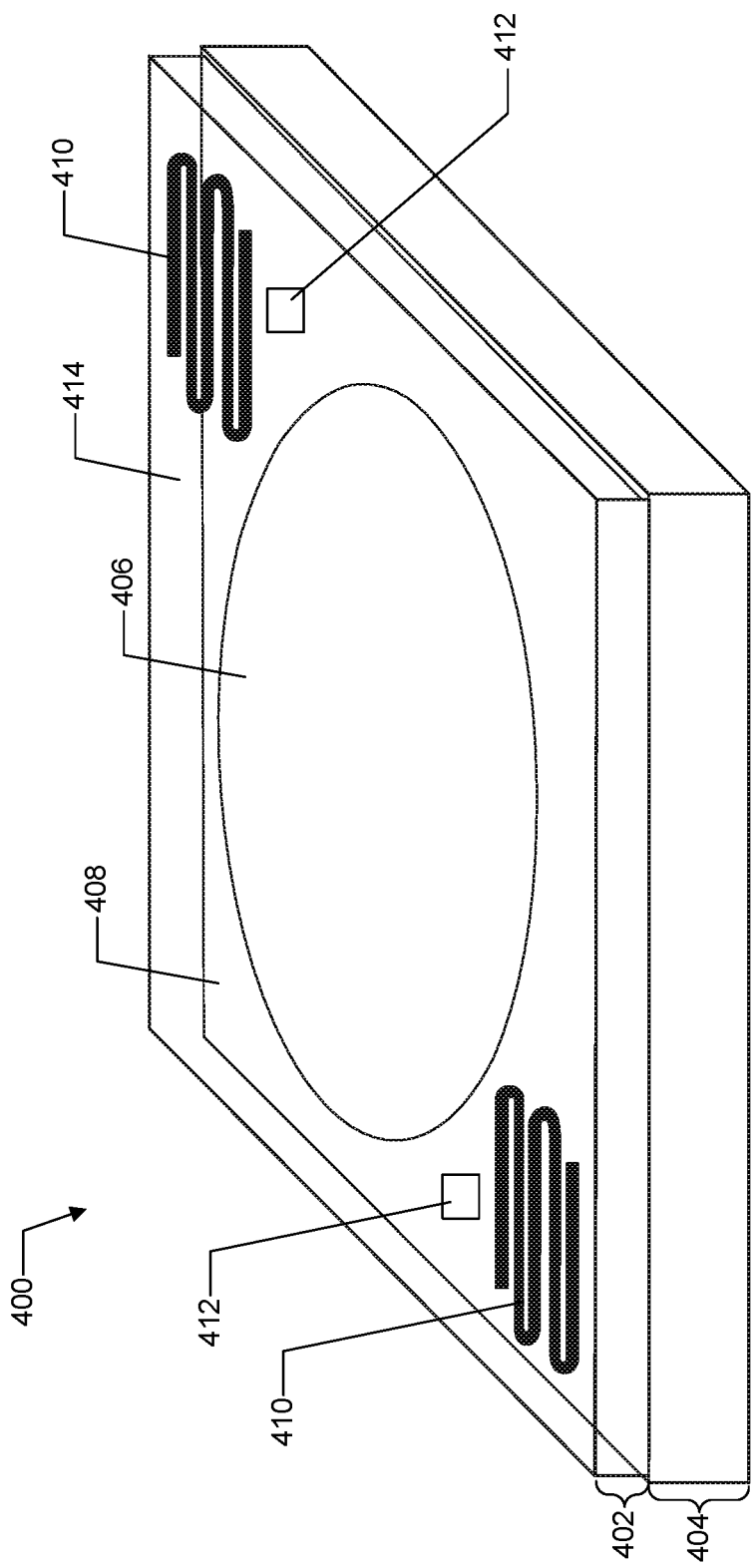
Figure 5:
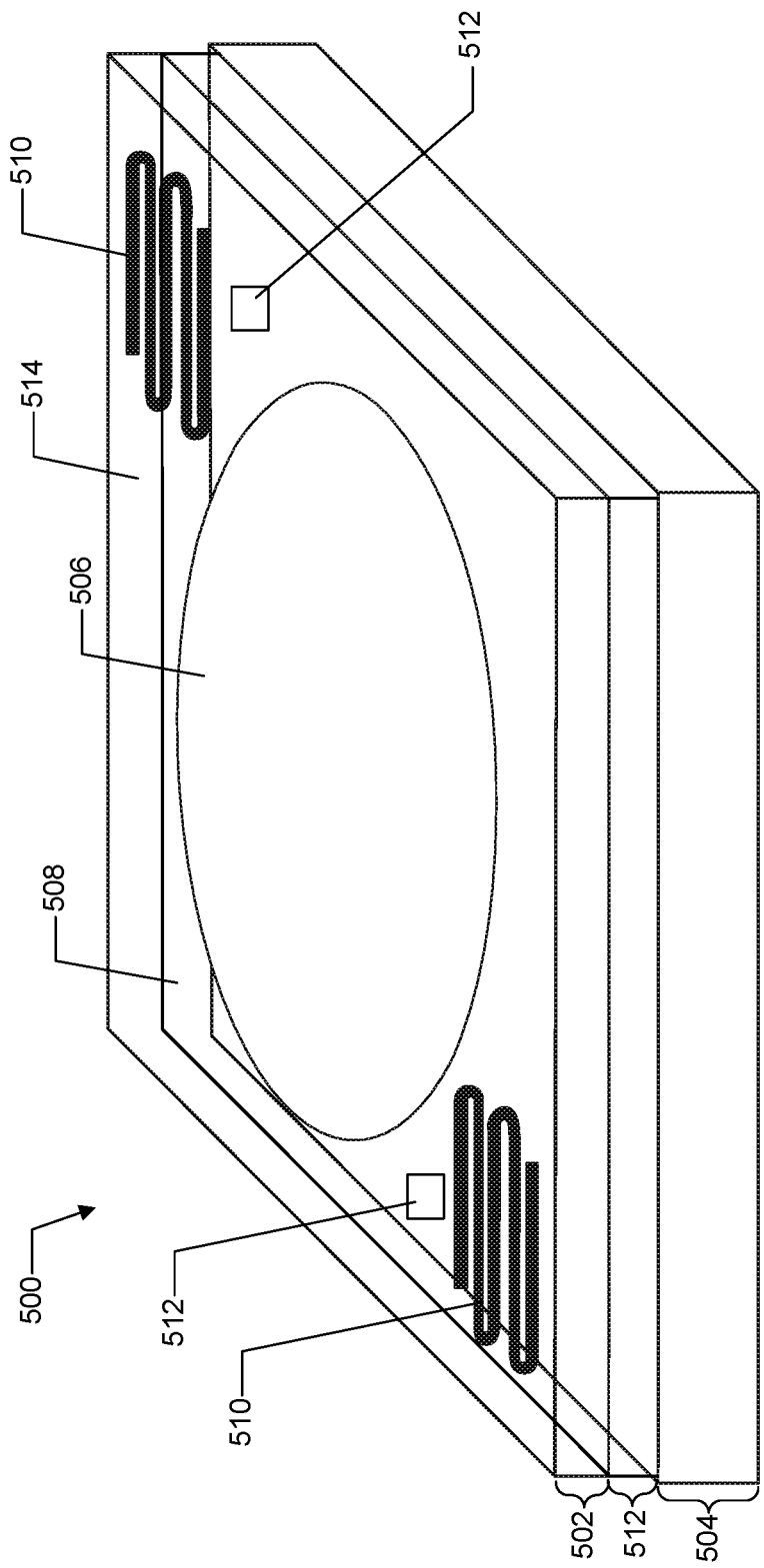

FIGS. 3-5 illustrate example liquid lens apparatuses 300/400/500 comprising a sensor 310/410/510, according to some embodiments. In some embodiments, the liquid lens apparatus 300/400/500, respectively, comprises a first substrate (e.g., top substrate) 302/402/502, a sensor (e.g., a thermal sensor) 310/410/510 configured to detect a temperature of the liquid lens apparatus 300/400/500, and a heating device 208 (of FIG. 2) configured to apply heat to the liquid lens apparatus 300/400/500 to change the temperature of the liquid lens apparatus 300/400/500.

In some embodiments, the first substrate 302/402/502 may be made of glass. In some embodiments, the first substrate 302/402/502 may have a central portion 306/406/506 and a peripheral portion 308/408/508, outside of the central portion 306/406/506. In some embodiments, the central portion 306/406/506 may be a window. In some embodiments, to relieve thermal expansion stress (e.g., resulting from heating of the liquid lens apparatus caused by the heating device 208 applying heat to the liquid lens apparatus 300/400/500, other components of an optical system or electronic device applying heat to the liquid lens apparatus 300/400/500, or a relatively high ambient temperature), the window may flex outward, for example, away from a cavity formed by one or more substrates as discussed below. In response to the central portion 306/406/506 flexing outward, the liquid lens apparatus 300/400/500's focal length may change. In some embodiments, the sensor 310/410/510 may provide feedback (e.g., to the controller 204 of FIG. 2) of the change of temperature of the liquid meniscus lens 400/500. Moreover, in some embodiments, the sensor 310/410/510 may provide feedback (e.g., to the controller 204 of FIG. 2) to stabilize the temperature of the liquid lens apparatus 300/400/500 and/or to compensate for the heating (e.g., to compensate for the changing focal length) by, for example, adjusting the position of the interface 110. For example, the liquid lens apparatus 300/400/500 can compensate for the flexing of the window by adjusting the position of the interface 110 such that the combination of the optical power provided by the flexed window and the interface 110 is the desired optical power for the liquid lens apparatus 300/400/500 (e.g., to achieve the desired focus).

In some embodiments, as illustrated in FIGS. 3 and 4, the first substrate 302/402 may be adhered to a second substrate (e.g., a bottom substrate) 304/404 to form a cavity in the central portion 306/406. In some embodiments, as illustrated in FIG. 5, the first substrate 502 may adhere to a second substrate (e.g., a bottom substrate) 504 via a third substrate (e.g., an intermediate substrate) 512 to form a cavity therebetween in the central portion 506. In some embodiments, the cavity may contain two immiscible liquids making up the liquid lens 500 functionality. In some embodiments, the central portion 506 may coincide with (or overlay) the cavity.

In some embodiments, as illustrated in FIG. 3, the liquid lens apparatus 300 may include sensor 310 disposed between the first substrate 302 and the second substrate 304 (e.g., top substrate and bottom substrate). In some embodiments, to isolate the sensor 310 from the liquids, the sensor 310 can be formed through laser patterning, which may cause substrate damage, questionable dielectric isolation, and low pattern fidelity. In some embodiments, sensor 310 can be close to the immiscible liquids, which can lead to poor insulation, electrical leakage (e.g., to the common electrode between the first substrate 302 and the second substrate 304), and low reliability. For example, in some embodiments, polar fluid disposed in the cavity of the liquid lens apparatus 300 may easily diffuse through bonds and damage the sensor 310 and open paths for electrical leakage. Moreover, in some embodiments, due to the confined space between the first substrate 302 and the second substrate 304 and/or bonding requirements, a type and nature (e.g., material) of the sensor 310 may be limited.

In some embodiments, as illustrated in FIGS. 4 and 5, liquid lens apparatus 400/500 may include sensor 410/510 on a first surface (e.g., a top surface) 414/514 of the first substrate 402/502 such that the sensor 410/510 is not between the first substrate 402/502 and the second substrate 404 or the third substrate 512 and that the sensor 410/510 is on an exterior surface of the liquid lens apparatus. In some embodiments, the sensor 410/510 may be separated from an interior of the liquid lens apparatus 400/500 by at least 120 µm. In some embodiments, as will be discussed below, to protect the sensor 410/510 from current produced by the heating device 208 (of FIG. 2) or other electrical components of the liquid lens apparatus 400/500 or of the imaging system 200 (of FIG. 2), the sensor 410/510 may be insulated from the electrical components (e.g. heating device 208) by a dielectric film. Further, in some embodiments, a transient voltage suppressor 412/512 may be directly fabricated on the dielectric film (e.g., using amorphous silicon or via die bonding). The transient voltage protector 412/512 may protect electric current from all electrical components (e.g., heating device 208) prior to receipt by the sensor 410/510. In turn, the transient voltage protector 412/512 may protect the sensor 410/510 from an overvoltage condition provided by other electronics (e.g., heating device 208).

In some embodiments, rather than forming sensor 410/510 by laser patterning like the sensor 310 of FIG. 3, sensor 410/510 may be formed via microfabrication (e.g., lithographically). In some embodiments, where the sensor 410/510 is formed lithographically on the first surface (e.g., a top surface) 414/514 of the first substrate 402/502, the sensor 410/510 may have a higher fidelity than the sensor 310 located between the substrates 302/304 (of FIG. 3). In some embodiments, where the sensor 410/510 is formed lithographically, it may be possible to perform laser bonding while avoiding a surface of the sensor 410/510. In some embodiments, laser bonding may not be performed on a surface of a sensor to be placed between substrates. In some embodiments, when laser bonding is used to create the sensor and the bond at the same time, a thin piece of metal may be required, resulting in a comprise between the sensor and the bond formed around the sensor.

In some embodiments, by forming the sensor 410/510 on the first surface 414/514 of the first substrate 402/502 such that the sensor 410/510 is on an external surface of the liquid lens apparatus 400/500, laser bonding may be utilized to form the sensor 410/510. And, in some embodiments, as a result of being able to able to form the sensor 410/510 on an external surface of the liquid lens apparatus 400/500, the sensors 410/510 may be made of unique materials that are more sensitive to temperature changes than materials used to fabricate sensors 310 between substrates 302/402 (e.g., using materials that facilitate laser bonding). In some embodiments, the sensor 410/510 may be capable of detecting a change in temperature of the liquid lens 400/500 of 0.1 degree centigrade. For example, sensors 414/514 of the first substrate 402/502 may comprise, consist essentially of, consist of, but are not limited to, an alloy metal (e.g., nickel), $VO_x$, SiGe:H, $V_{1-x}W_xO_2$, YBCO, and the like $VO_x$, SiGe:H, $V_{1-x}W_xO_2$, YBCO, and the like.

Example Liquid Lens Apparatuses with a Sensor on a Top Surface

Figure 6:
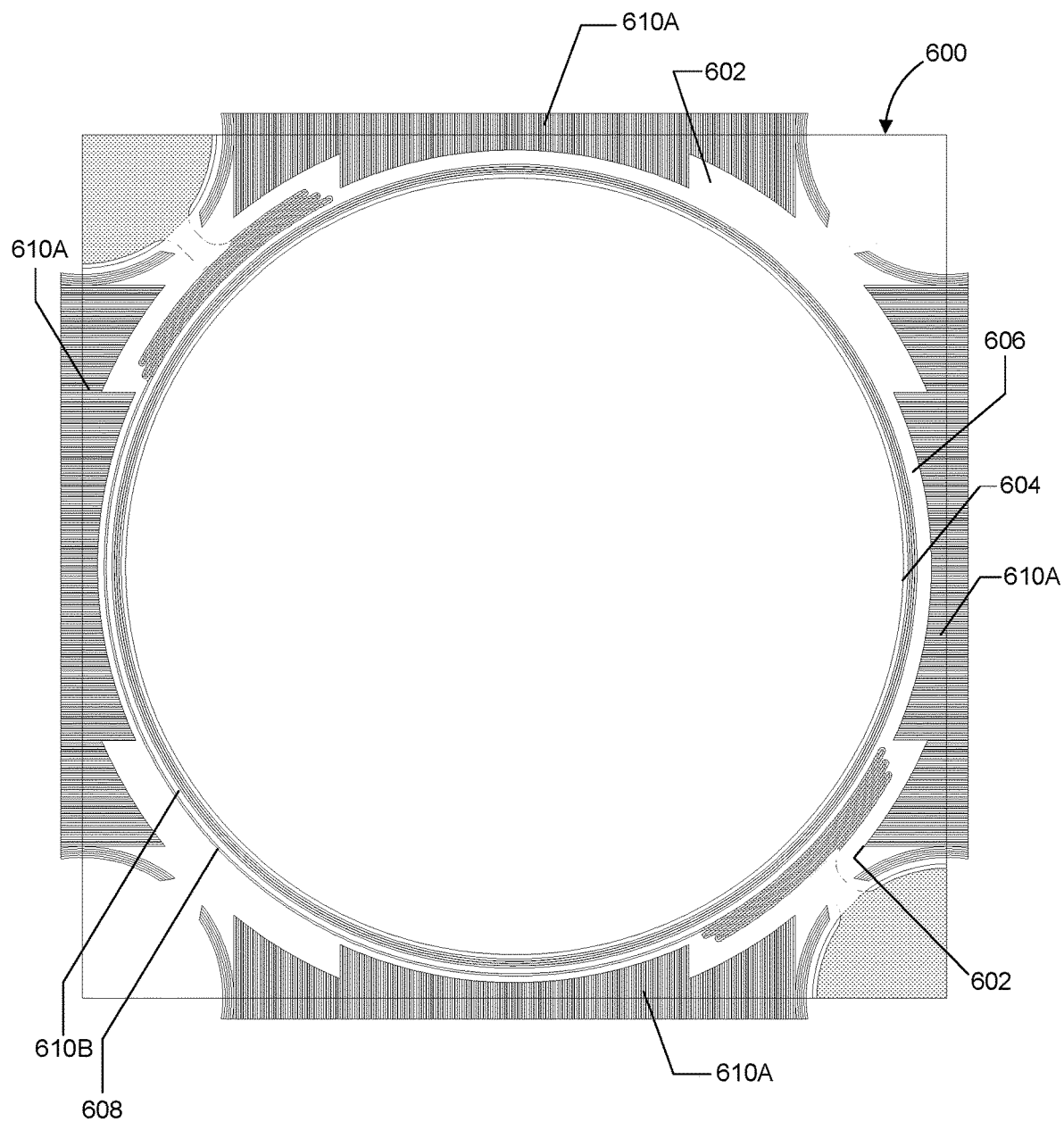
FIGS. 6 and 7 are top views of a top substrate of the liquid lens apparatus of FIGS. 4 and 5, according to some embodiments.
Figure 7:
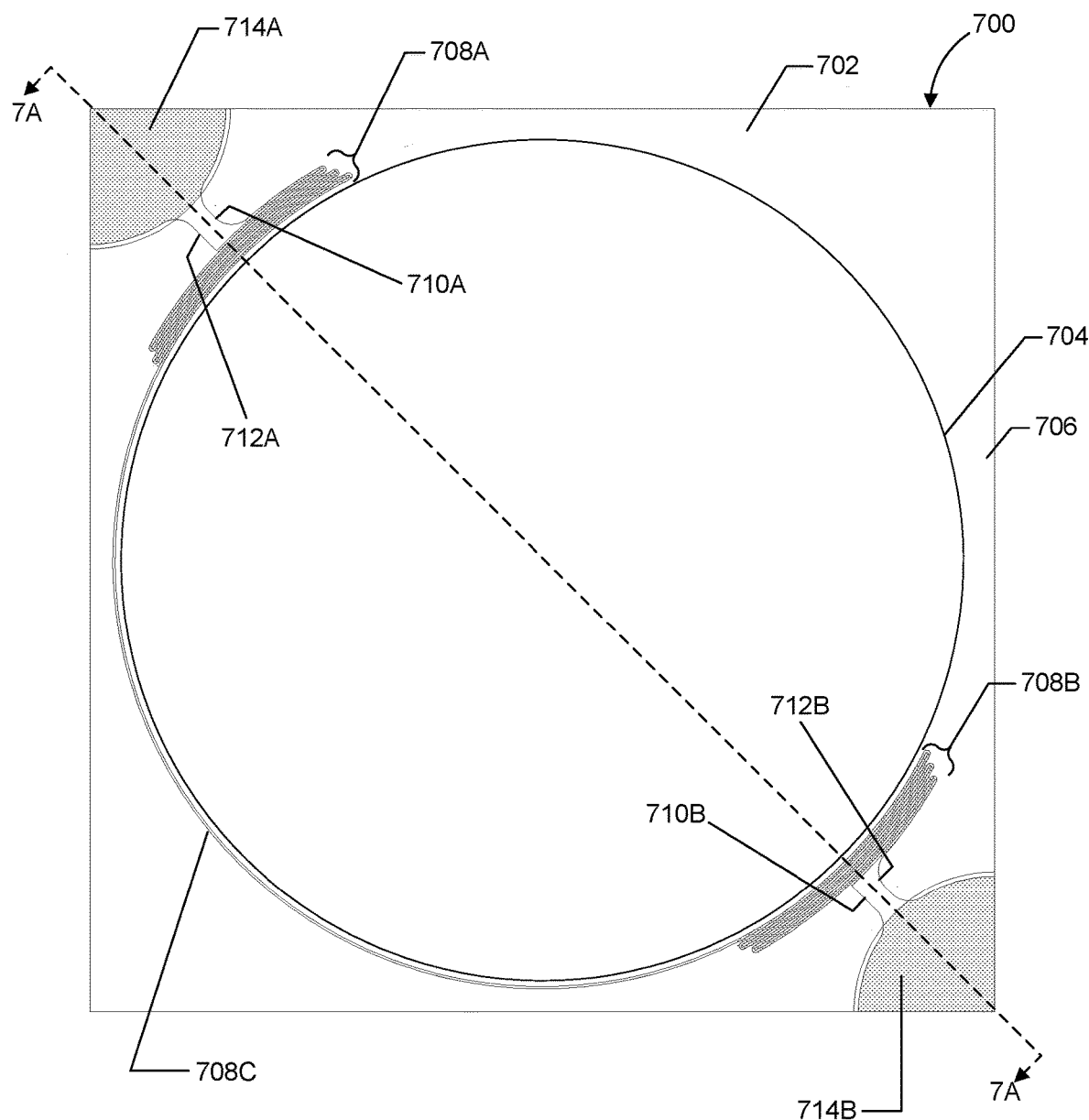

FIGS. 6 and 7 illustrate a top view of a first substrate 600/700, according to some embodiments. In some embodiments, the first substrate 600/700 comprises a first surface 602/702 (e.g., top surface), a second surface (e.g. a bottom surface) (not depicted) opposite the first surface 602, a central portion 604/704, a peripheral portion 606/706 outside of the central portion 604/704, and a sensor 608/708A-C located on the first surface 602/702. In some embodiments, the sensor 608/708A-C may be configured to measure or detect a temperature of the liquid lens apparatus 400/500 (illustrates in FIGS. 4 and 5). In some embodiments, the sensor 608/708A-C may be made of (e.g., comprise, consist essentially of, or consist of) a material, for example, but not limited to, an alloy metal (e.g., nickel), $VO_x$, SiGe:H, $V_{1-x}W_xO_2$, and YBCO.

As such, in some embodiments, to appropriately measure the temperature of the liquid lens apparatus, the sensor 608/708A-C may have a target nominal resistance (e.g., in the range of approximately 100 ohms to 10000 ohms), a length (e.g., in the range of approximately 10 millimeters to 200 millimeters), a width (e.g., in the range of approximately 1 micrometer to 30 micrometers), and/or a thickness (e.g., in the range of approximately 50 nanometers to 1000 nanometers). In some embodiments, the material, the target nominal resistance, the length, the width, and/or the thickness of the sensor 608/708A-C may be selected by a manufacturer or a user of the liquid lens apparatus. And, in some embodiments, based on the selected material, target nominal resistance, length, width, and/or thickness of the sensor 608A/608B/608C, the remaining of the material, nominal resistance, length, width, and/or thickness of the sensor 608A/608B/608C may be determined. For example, the material and/or the target nominal resistance may be selected by the user, and the length, the width, and the thickness, along with the material or the target nominal resistance (if either is not elected by the user), of the sensor 608A/608B/608C may be chosen by the manufacturer.

Along these lines, in some embodiments, based on the temperature coefficient of resistance (TCR) of the material selected for the sensor 608/708A-C, the material may be more or less sensitive to the detection of a temperature change of a liquid lens apparatus. In some embodiments, a material having a TCR of 1.0 or lower may not be sensitive to a change in temperature of the liquid lens apparatus, whereas a material having a TCR higher than 1.0 may be sensitive to a change in temperature of the liquid lens apparatus. Sensitive materials include Vox and YBCO, just to name a few examples. Less sensitive materials include Al and Ni, just to name a few examples. Accordingly, in some embodiments, based on the selected material (e.g., whether the material is sensitive or insensitive) and its TCR selected for the sensor 608/708A-C, the target nominal resistance, length, width, and/or thickness of the sensor 608A/608B/608C may be selected. In some embodiments, the target nominal range may be in the range of approximately 1,200 ohms to approximately 2,000 ohms (e.g., 1,500 ohms), and the length, width, and/or thickness of the sensor 608A/608B/608C is thereafter selected.

Table 1, provided below, illustrates example properties of materials—Al, Au, Cu, Ni, NiCr, and VOx—that may be selected for the sensor 608/708A-C having a target nominal resistance of 1500 ohms. Specifically, materials Al, Au, Cu, Ni, and NiCr may be selected for the sensor 608/708A-C and may have a predetermined width and length of 10 μm and 23 mm, respectively. Moreover, material VOx may be selected for the sensor 608/708A-C and may have a predetermined width and length of 200 μm and 5 mm, respectively.

TABLE 1

| Material | Ohm-meters | Ohm-0.023 meters | Target Ohms | Calc. Cross Section m^2 | Width (μm) | Length (mm) | Thickness (nm) |
| --- | --- | --- | --- | --- | --- | --- | --- |
| Al | 2.80E−08 | 6.44E−10 | 1500 | 4.29E−13 | 10.00 | 23.00 | 42.93 |
| Au | 2.40E−08 | 5.52E−10 | 1500 | 3.68E−13 | 10.00 | 23.00 | 36.80 |
| Cu | 1.70E−08 | 3.91E−10 | 1500 | 2.61E−13 | 10.00 | 23.00 | 26.07 |

TABLE 1-continued

| Material | Ohm-meters | Ohm-0.023 meters | Target Ohms | Calc. Cross Section m^2 | Width (μm) | Length (mm) | Thickness (nm) |
|---|---|---|---|---|---|---|---|
| Ni | 7.00E−08 | 1.61E−09 | 1500 | 1.07E−12 | 10.00 | 23.00 | 107.3 |
| NiCr | 1.10E−06 | 2.53E−08 | 1500 | 1.69E−11 | 10.00 | 23.00 | 1686.67 |
| VOx | 1.00E−03 | 5.00E−07 | 1500 | 3.33E−10 | 200.00 | 5.00 | 1.67E+03 |

Referring now to FIG. 6, the first substrate 600's first surface 602 may also have an insulating layer 610A (e.g., dielectric layers) separating the sensor 608 and conductive pad 612 from the central portion 604 and insulating the sensor 608 and from other electrical components (not illustrated) within the liquid lens apparatus. As such, the insulating layer 610A may reside between the sensor 608 and central portion 604, and the insulating layer 610A may reside on an exterior surface of the sensor 608 such that it is opposite from insulating layer 610B.

Further, in some embodiments, based on the material of the sensor 608, the sensor 608 may have a particular design to accommodate the length of the sensor 608 and/or to assist in the functionality of the sensor 608 (e.g., detecting a temperature of the liquid lens apparatus 600).

Referring now to FIG. 7, the sensor 608 (of FIG. 6) may comprise a first portion of the sensor 708A, a second portion of the sensor 708B and a third portion of the sensor 708C. In some embodiments, the first portion of the sensor 708A and the second portion of the sensor 708B's design may be located on opposing sides of the middle of the substrate 700's central portion 704. In some embodiments, although the first portion of the sensor 708A and the second portion of the sensor 708B may have the same unique patterns as illustrated, the first portion of the sensor 708A and the second portion of the sensor 708B may also have different unique patterns.

As such, the first and second portions of the sensor 708A/708B may be connected to each other by a third portion of the sensor 708C. In some embodiments, the first portion of the sensor 708A and the second portion of the sensor 708B may be replicated on opposing ends of the first substrate 700's central portion 704. For example, when the central portion 704 is circular, the first portion of the sensor 708A and the second portion of the sensor 708B may be on opposite sides of the circle, and the third portion of the sensor 708C's may circumscribe approximately half of first substrate 700's central portion 704 to connect the first portion of the sensor 708A to the second portion of the sensor 708B.

In some embodiments, depending on the material of the sensor 708A-C, the design of the first and second portions of the sensor 708A may be different. In some embodiments, the design of the first and second portions of the sensor 708A/708B may assist the sensor 708A-C in detecting a change in temperature of the liquid lens apparatus. In some embodiments, the design of the first and second portions of the sensor 708A/708B may be selected by a manufacturer. In some embodiments, as illustrated, if the sensor 608A/608B/608C is made, for example, of nickel, the design of sensor 608A/608B may be a serpentine line and have a width of 10 μm.

Further, the sensor 708A-C may comprise a first conductive lead 712A and a second conductive lead 712B. The first and second conductive leads 712A/712B may be of opposite polarity. Moreover, the first and second conductive leads 712A/712B may form conductive pads 714A/714B. As illustrated, the conductive pad 714A/714B may be adjacent to the first and second portions of the sensor 708A and 708B.

Figure 8:
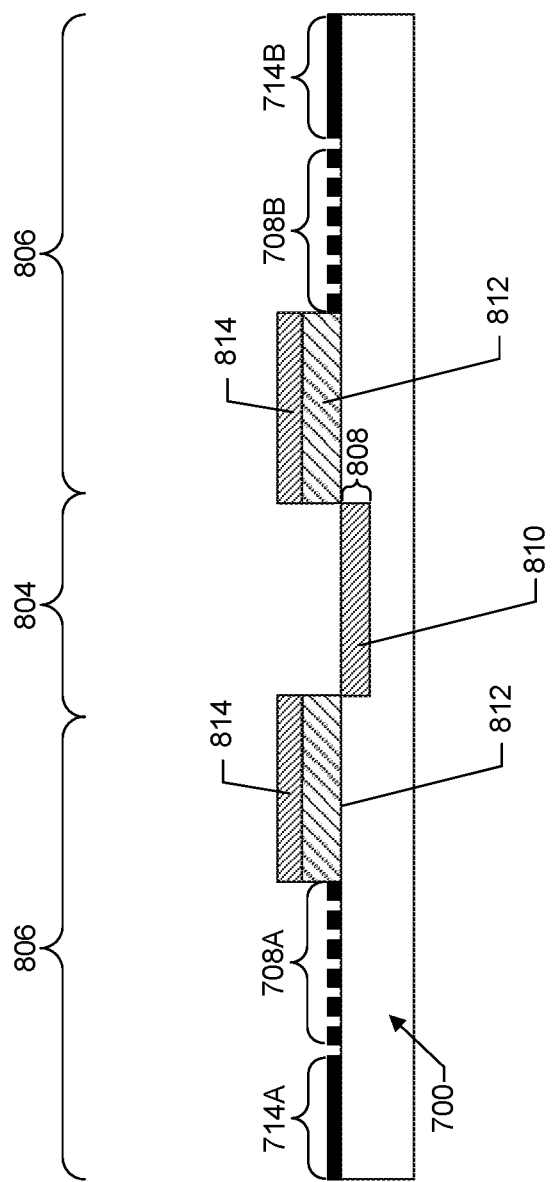
FIG. 8 is a side view of the top substrate across cross-section 7A-7A of FIG. 7, according to some embodiments.

FIG. 8 is a cross-sectional view of the first substrate 700 along line 7A-7A of FIG. 7, according to some embodiments. As stated above, in some embodiments, the first substrate 700 may have a central portion 804 and a peripheral portion 806 outside of the central portion 804. In some embodiments, the first substrate 700's central portion 804 may have a recess 808 or other structure designed to provide clear optical access to the liquid lens apparatus. As such, in some embodiments, the first substrate 700's central portion 804 may serve as a window to view a cavity of the liquid lens apparatus placed underneath the first window.

In some embodiments, the peripheral portion 806 may include a sensor 708A/708B, a conductive pad 714A/714B, a dielectric layer 812, and an anti-reflective coating 814. The sensor 708A/708B may be placed onto the substrate 700. The dielectric layer 812 may be placed onto the substrate 700 and between the recess 810 and the sensor 708A/708B. As such, the anti-reflective coating 814 may be placed onto the dielectric layer 812. Moreover, the conductive pad 714A/714B may extend outwardly from the sensor 708A/B in a direction opposite to the dielectric layer 812 and the anti-reflective coating 814.

Figure 9A:
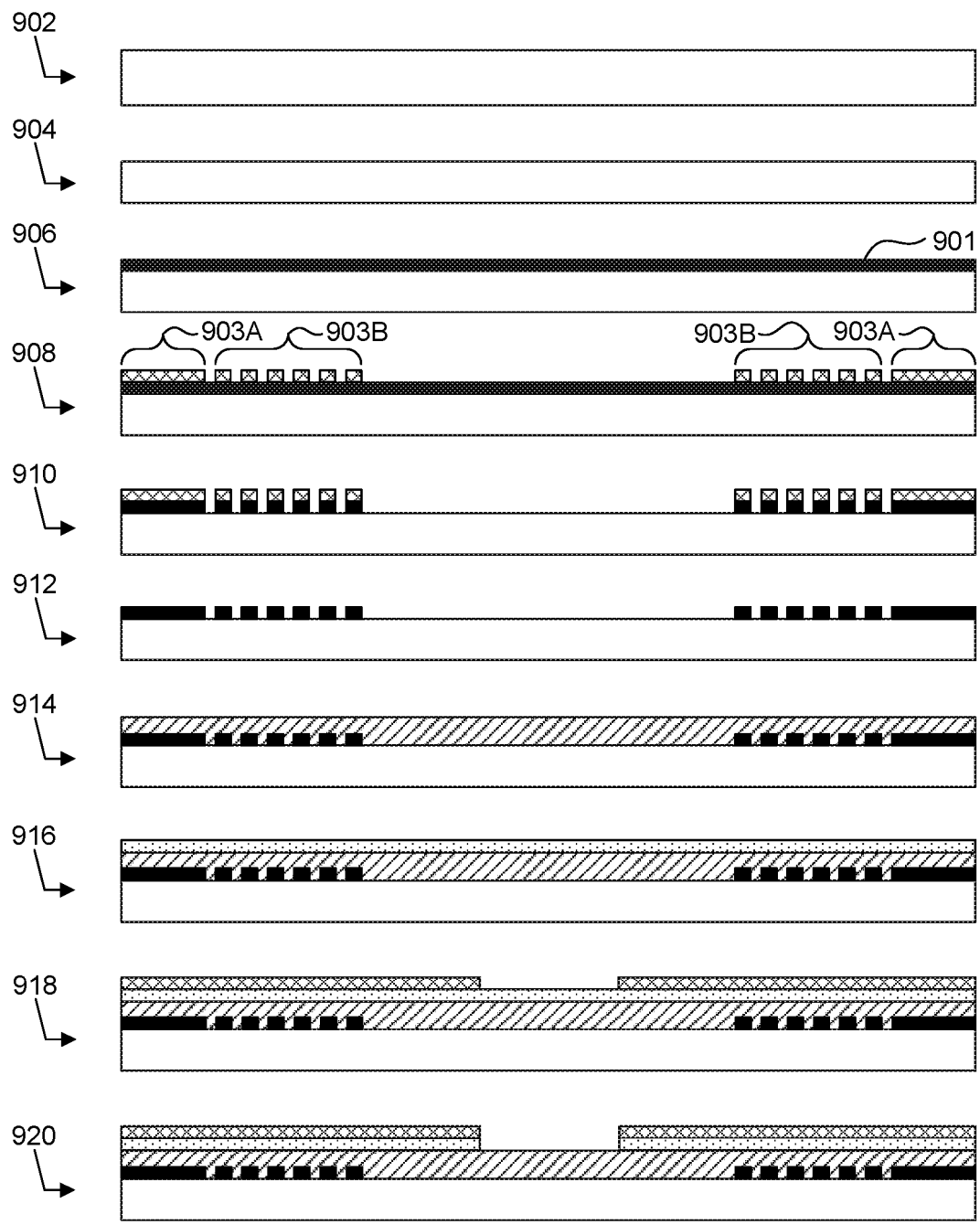
FIGS. 9A-9B and 10 are flowcharts of example methods for forming the top substrate of FIGS. 4 and 5, according to some embodiments.
Figure 9B:
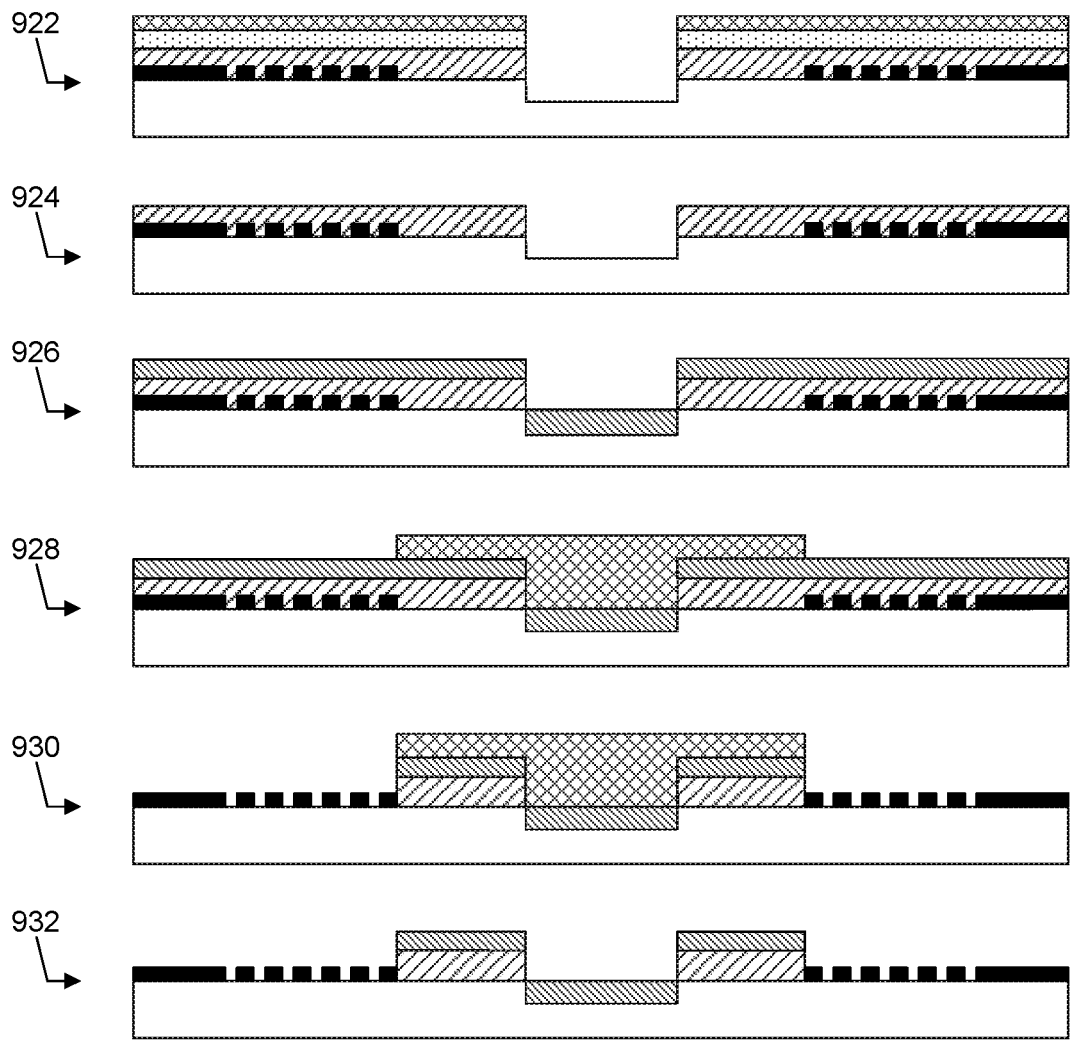
Figure 10:
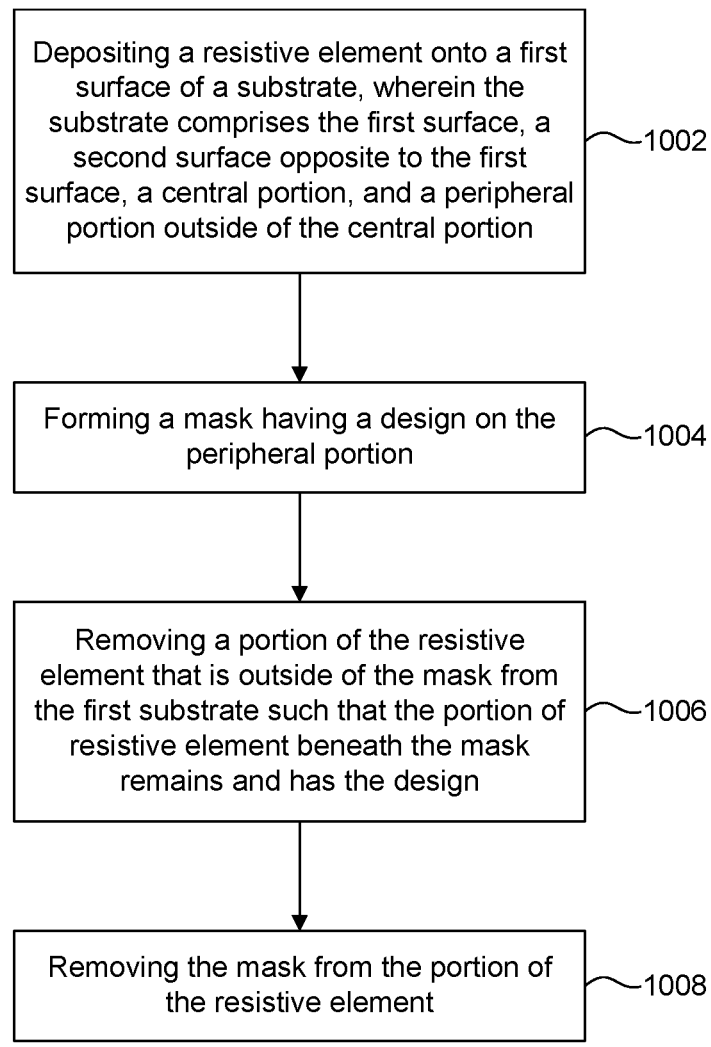

Example Methods for Forming a Sensor on an Outside Surface of a Liquid Lens Apparatus FIGS. 9A, 9B and 10 illustrate example methods 900 and 1000 for forming a sensor on a surface of a substrate, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 9A, 9B and 10, as will be understood by a person of ordinary skill in the art.

Referring now to FIGS. 9A and 9B, method 900 shall be described with reference to FIGS. 4-8. However, method 900 is not limited to those example embodiments.

In 902, a first substrate 402/502/600/700 used to construct a liquid lens apparatus 400/500 is provided. In some embodiments, as discussed above, the first substrate 400/500/600/700 may have a first surface 414/514/602/702 (e.g., top surface) and a second surface (e.g., a bottom surface) opposite to the first surface 414/514/602/702. As such, the first substrate 402/502/600/700's first surface 414/514/602/702 may be adhered to another substrate to form an interior cavity of a liquid lens apparatus. Accordingly, the following steps are to be performed on the first substrate 402/502/600/700's first surface 414/514/602/702.

In 904, the first substrate 402/502/600/700's first surface 414/514/602/702 is etched so that the first surface 414/514/602/702 is smooth and a resistive element may be placed thereon.

In 906, a resistive element 901 used to create a sensor 410/510/608/708A-C and conductive layer 714 is provided onto of the first substrate 402/502/600/700's first surface 414/514/602/702. For example, all or substantially all of the first surface 414/514/602/702 may be coated (e.g., with a conductive material) to form the resistive element 901, which may be patterned as described herein to form, for example, the sensor 410/510/608/708A-B.

In 908, a lithographic mask is provided onto a portion of the resistive element 901. In some embodiments, as discussed above, the first substrate 402/502/600/700 may comprise a central portion 406/506/604/704/804A-B and a peripheral portion 408/508/606/706/806A-B outside of the central portion 406/506/604/704/804A-B. As such, in some embodiments, the lithographic mask may be provided onto a portion of the resistive element 901 that overlays the peripheral portion 408/508/606/706/806A-B of the substrate 402/502/600/700. The lithographic mask may protect the resistive element 901 from etching or any other process applied to the resistive element 901 to remove or modify the resistive element 901 or a portion thereof.

In some embodiments, as also discussed above, the substrate 402/502/600/700 may be provided with a sensor 410/510/608/708A-C and conductive layer 714. The sensor 410/510/608/708A-B may have a specific length, width, and/or design. As such, in some embodiments, to form the sensor 410/510/608/708A-C and conductive layer 714, the lithographic mask may have a first portion 903A and a second portion 903B. The first portion 903A may completely cover a first portion the resistive element 901. The second portion 903B may be adjacent to the first portion 903A and have a second portion of the resistive element 901 adjacent to the first portion of the resistant element. And the second portion 903B may have openings to permit the creation of the sensor 410/510/608/708A-B. Thus, the second portion 903B may expose parts of the resistive element 901. In some embodiments, the lithographic mask is a hard mask.

In 910, a portion of the resistive element 901 exposed by the lithographic mask (e.g., within the pattern provided by the lithographic mask) is removed (e.g., via etching) from the first substrate 402/502/600/700 such that the remaining portion of the resistive element 901 is beneath the lithographic mask. As a result, the remaining resistive element 901 may have the same design as the lithographic mask's design.

In 912, the lithographic mask is stripped from the remaining portion of the resistive element 901. As such, in some embodiments, the formation of the sensor 410/510/608/708A-C and conductive layer 714 may be complete.

In 914, a dielectric layer 812A-C is deposited onto the first substrate 402/502/600/700 and the sensor 410/510/608/708A-C and conductive layer 714. The dielectric layer 812A-C may serve as an insulating layer for the resistive element 901. For example, all or substantially all of the first surface 414/514/602/702 and/or the conductive layer 714 may be coated (e.g., with a dielectric material) to form the dielectric layer 812A-C, which may be patterned as described herein.

In 916, a second mask is provided onto the dielectric layer 812. Unlike the lithographic mask, the second mask may not have a design. In some embodiments, the second mask may not allow the dielectric layer 812 residing underneath to be removed. In some embodiments, the second mask may be a hard mask.

In 918-922, a window in the central portion 406/506/604/704/804 of the first substrate 402/502/600/700 is formed. For example, in some embodiments, in 918, a ring-shaped third mask is provided on the dielectric layer 812 such that the hole of the ring-shaped mask overlays the central portion 804 of the first substrate 402/502/700. In some embodiments, the ring-shaped third mask may be a hard mask.

In 920, the third mask residing in the central portion 406/506/604/704/804 of the first substrate 402/502/600/700 is removed (e.g., via etching) from dielectric layer 812A/812B. In 922, the dielectric layer 812 residing in the central portion 406/506/604/704/804, and a portion of first substrate 402/502/600/700 residing in the central portion 406/506/604/704/804 of the first substrate 402/502/600/700, is removed (e.g., via etching).

In 924, the second and third masks provided at steps 916 and 918 are removed, thereby exposing the dielectric layer 812 in the peripheral portion 606/706 of the first substrate 402/502/600/700.

In 926, an anti-reflective coating 814 is provided in the recess 808 of the central portion 804 of the first substrate 402/502/600/700 and on the dielectric layer 812 in the peripheral portion 806 of the first substrate 402/502/600/700. The anti-reflective coating 814 may reduce light reflection in the central portion 804 of the first substrate 402/502/600/700.

In 928, a fourth mask is placed onto the anti-reflective coating 814 such that the fourth mask does not reside above the sensor 410/510/608/708A-C and conductive layer 714. In some embodiments, the fourth mask is a hard mask.

In 930, the dielectric layer 812 and the anti-reflective coating 814 residing over the sensor 410/510/608/708A-C and conductive layer 714 may be removed (e.g., via etching).

In 932, the fourth mask is removed from the anti-reflective coating 914. In doing so, the first substrate 402/502/600/700, the sensor 410/510/608/708A-C, and conductive layer 714 are capable of being utilized in a liquid lens apparatus 400/500.

Referring now to FIG. 10, method 1000 shall be described with reference to FIG. 4-8. However, method 1000 is not limited to those example embodiments.

In 1002, a resistive element is deposited onto a first surface 414/514/602/702 of a first substrate 402/502/600/700 used to construct a liquid lens apparatus 400/500. In some embodiments, the first substrate 402/502/600/700 comprising the first surface 414/514/602/702 and a second, opposing surface. In some embodiments, as stated above, the first substrate 402/502/600/700's second surface may be adhered to another substrate (e.g., second substrate 404/504 or third substrate 406/506) to form a cavity for a liquid lens apparatus.

In some embodiments, the first substrate 402/502/600/700 may have a peripheral portion 408/508/606/706/806 and a central portion 406/506/604/704/804 within the peripheral portion 606/706/806. As such, the peripheral portion 408/508/606/706/806 may be outside of the central portion 406/506/604/704/804. Moreover, the thickness of the resistive element may be based on the type of resistive element. Further, the first substrate 402/502/600/700 may be made of polymeric, glass, ceramic, glass-ceramic material, or the like.

In 1004, a first lithographic mask may be placed onto a portion of the peripheral portion 408/508/606/706/806 of the first substrate 402/502/600/700. The lithographic mask may have a preconfigured design based on the type of material of resistive element and the length, thickness, and width of the resistive element.

In 1006, a portion of the resistive element outside of the lithographic mask may be removed (e.g., via etching) from the first substrate 402/502/600/700 such that a heat sensor having the preconfigured design of the lithographic mask is formed form a remaining portion of resistive element beneath the mask.

In 1008, the lithographic mask may be removed from the heat sensor. As such, the heat sensor is to be placed on an external surface of the liquid lens apparatus. And in some embodiments, the heat sensor may be configured to detect a temperature of the liquid lens apparatus 400/500 to enable compensation for thermal expansion or contraction of the liquid lens apparatus 400/500 resulting from changest of temperature of the liquid lens apparatus 400/500.

It is to be understood that the phraseology or terminology herein is for the purpose of description and not of limitation, such that the terminology or phraseology of the present specification is to be interpreted by those skilled in relevant art(s) in light of the teachings herein.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals, and others. Further, firmware, software, routines, and/or instructions may be described herein as performing certain actions. However, it should be appreciated that such descriptions are merely for convenience and that such actions, in fact, result from computing devices, processors, controllers, or other devices executing the firmware, software, routines, and/or instructions.

The aforementioned examples are illustrative, but not limiting, of the embodiments of this disclosure. Other suitable modifications and adaptations of the variety of conditions and parameters normally encountered in the field, and which would be apparent to those skilled in the relevant art(s), are within the spirit and scope of the disclosure.

While specific embodiments of the disclosure have been described above, it will be appreciated that the invention may be practiced otherwise than as described. The description is not intended to limit the invention.

It is to be appreciated that the Detailed Description section, and not the Summary and Abstract sections, is intended to be used to interpret the claims. The Summary and Abstract sections may set forth one or more but not all embodiments of the present disclosure as contemplated by the inventor(s), and thus, are not intended to limit the present invention and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described embodiments but should be defined only in accordance with the following claims and their equivalents.

What is claimed is:

1. A liquid lens apparatus, comprising:
    a first substrate comprising:
        a central portion, and
        a peripheral portion outside of the central portion; and
    a lithographically formed sensor on the peripheral portion of the first substrate such that the lithographically formed sensor is on an exterior surface of the liquid lens apparatus,
    wherein when the lithographically formed sensor is on the exterior surface of the liquid lens apparatus, the lithographically formed sensor detects a temperature of the liquid lens apparatus, enabling the liquid lens apparatus to compensate for thermal expansion or contraction of the liquid lens apparatus resulting from changes in the detected temperature of the liquid lens apparatus.

2. The liquid lens apparatus of claim 1, wherein the first substrate comprises a window.

3. The liquid lens apparatus of claim 2, wherein the window flexes outward upon an increase of the temperature of the liquid lens apparatus.

4. The liquid lens apparatus of claim 1, further comprising:
    a second substrate; and
    a cavity defined by at least the first substrate and the second substrate, wherein the sensor is positioned outside of the cavity.

5. The liquid lens apparatus of claim 1, further comprising:
    a heating device configured to provide heat to the liquid lens apparatus that is sufficient to increase the temperature of the liquid lens apparatus and to thermally expand the liquid lens apparatus.

6. The liquid lens apparatus of claim 5, wherein the sensor is isolated from the heating device.

7. The liquid lens apparatus of claim 1, wherein the sensor is configured to detect a change in the temperature of 0.1 degree centigrade.

8. The liquid lens apparatus of claim 1, wherein the sensor has a target resistance of 1500 ohms.

9. The liquid lens apparatus of claim 1, wherein the lithographically formed sensor is a photolithographically formed sensor.

10. The liquid lens apparatus of claim 1, wherein the lithographically formed sensor comprises one or more scribes.

* * * * *